United States Patent
Koretsky et al.

(10) Patent No.: US 7,001,132 B2
(45) Date of Patent: *Feb. 21, 2006

(54) FOLDABLE RAMP

(75) Inventors: Dmitry Koretsky, Chatsworth, CA (US); Raymond Reynolds, Hollywood, CA (US)

(73) Assignee: Ricon Corp., Panorama City, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 10/755,175

(22) Filed: Jan. 8, 2004

(65) Prior Publication Data

US 2004/0172775 A1    Sep. 9, 2004

Related U.S. Application Data

(63) Continuation-in-part of application No. 10/143,590, filed on May 8, 2002, now Pat. No. 6,698,998.

(51) Int. Cl.
*B60P 1/00* (2006.01)

(52) U.S. Cl. ..................... 414/537; 414/921
(58) Field of Classification Search ............... 414/537
See application file for complete search history.

(56) References Cited

U.S. PATENT DOCUMENTS

| | | | | |
|---|---|---|---|---|
| 3,628,490 A | * | 12/1971 | Gehlen | 14/2.6 |
| 3,955,827 A | * | 5/1976 | Wonigar | 280/166 |
| 4,180,366 A | * | 12/1979 | Roth et al. | 414/540 |
| 4,251,179 A | * | 2/1981 | Thorley | 414/545 |
| 4,270,630 A | * | 6/1981 | Karkau | 187/200 |
| 4,864,673 A | * | 9/1989 | Adaway et al. | 14/71.1 |
| 5,391,041 A | * | 2/1995 | Stanbury et al. | 414/537 |
| 5,393,192 A | | 2/1995 | Hall et al. | 414/537 |
| 5,542,811 A | * | 8/1996 | Vartanian | 414/541 |
| 6,179,545 B1 | * | 1/2001 | Petersen et al. | 414/537 |
| 6,186,733 B1 | * | 2/2001 | Lewis et al. | 414/537 |
| 6,238,168 B1 | * | 5/2001 | Cohn et al. | 414/537 |
| 6,241,452 B1 | * | 6/2001 | Eekhoff | 414/537 |
| 6,343,908 B1 | * | 2/2002 | Oudsten et al. | 414/537 |
| 6,698,998 B1 | * | 3/2004 | Koretsky | 414/537 |
| 2004/0172775 A1 | * | 9/2004 | Koretsky et al. | 14/69.5 |
| 2005/0123385 A1 | * | 6/2005 | Kirsch | 414/573 |

* cited by examiner

*Primary Examiner*—Eileen D. Lillis
*Assistant Examiner*—Charles N. Greenhut
(74) *Attorney, Agent, or Firm*—Jeffer, Mangels, Butler & Marmaro, LLP (57) ABSTRACT

A foldable wheelchair ramp is disclosed having a mountable base, a first ramp section and a second ramp section. In an extended configuration, the first and second ramp sections form a single, continuous ramp for facilitating wheelchair access to vehicles. For convenient storage, the first and second ramp sections fold with respect to each other and preferably retract into the vehicle floor such that, in the folded configuration, the top surface of the second ramp section lies substantially in the same plane as the vehicle floor. A linking assembly is provided to facilitate and control the folding of the ramp sections. For safety purposes, the ramp also includes a lid that covers the gaps between the ramp and the vehicle floor when the ramp is in an extended position.

10 Claims, 8 Drawing Sheets

FOLDABLE RAMP

CROSS-REFERENCE TO RELATED APPLICATIONS

This application is a continuation-in-part of and claims priority from U.S. patent application Ser. No. 10/143,590 filed on May 8, 2002 now U.S. Pat. No. 6,698,998, the contents of which are incorporated herein by reference.

FIELD OF THE INVENTION

The present invention relates generally to passenger and wheelchair ramps and more particularly to a wheelchair ramp mountable in a low floor height vehicle and foldable for convenient storage in the vehicle. The device is unfolded to provide a ramp for wheelchairs and passengers to access the vehicle.

BACKGROUND OF THE INVENTION

There has been an increasing interest in developing automated devices to facilitate the mobility of people who have difficulty walking. Although various forms of wheelchairs have helped considerably, their users face many obstacles, such as getting in and out of vehicles like vans and buses. Wheelchair ramps are used to assist in the loading and unloading of passengers from vans, buses and other such vehicles. However, available ramps are often bulky and cumbersome. When bulky ramps are installed in vehicles, the components of the vehicle must be rearranged to accommodate the sizable ramps. For example, one known fold-over style ramp is typically 48 inches long. This length is needed in order to create a slope angle that can be traversed in a wheelchair. When stored, the known fold-over ramp requires a space of at least 48 inches on a bus. This presents a problems for a bus builder in that a typical low floor bus has a main structural member that sits approximately 35 inches in from the side edge of the bus. Thus, in order to accommodate a 48 inch ramp, the chassis rail of the bus must be partially cut to receive the ramp. Furthermore, the fare box may have to be repositioned to accommodate the ramp. In some buses, passenger seats are removed to allow additional room for the housing and operation of the ramps. Consequently, there is a need for new passenger ramps that are compact and capable of being installed in a vehicle without requiring the components of the vehicle to be rearranged. Yet, the ramp must be large enough and sufficiently durable to support the combined weight of a wheelchair and a person thereon during the loading and unloading process.

SUMMARY OF THE INVENTION

A foldable wheelchair ramp is disclosed having a mountable base, a first ramp section and a second ramp section. In an extended configuration, the first and second ramp sections form a single, continuous ramp for facilitating wheelchair access to a vehicle. For convenient storage, the first and second ramp sections fold with respect to each other and preferably retract into the vehicle floor such that, in the folded configuration, the top surface of the second ramp section lies substantially in the same plane as the vehicle floor.

A linking assembly is provided to facilitate and control the folding and unfolding of the ramp sections based on the movement of the deployment mechanism. In a preferred embodiment of the invention, the linking assembly includes a driving arm, a driven arm and a fold facilitating arm. The driving arm can be hydraulically, electrically or pneumatically powered. The driven arm is preferably pivotably connected to the driving arm and causes the first ramp section to rotate toward the base during the folding process. The driven arm is also pivotably connected to the fold facilitating arm, which causes the second ramp section to pivot and fold with respect to the first ramp section. When the ramp is in a fully folded configuration, the bottom surfaces of the ramp sections are preferably positioned in a facing relationship to each other and the linking assembly is stored in a storage area below the plane of the vehicle floor.

For safety purposes, the ramp also includes a lid that covers the empty storage area when the linking assembly has moved out of the storage area. The lid is preferably biased in an open position to allow the linking assembly access to the storage area during folding. To close the lid, a closing spring preferably connects the lid to a support member. When the ramp is extended outward, the driving arm preferably contacts the support member, causing the support member to pivot and the spring to pull the lid into a closed position.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
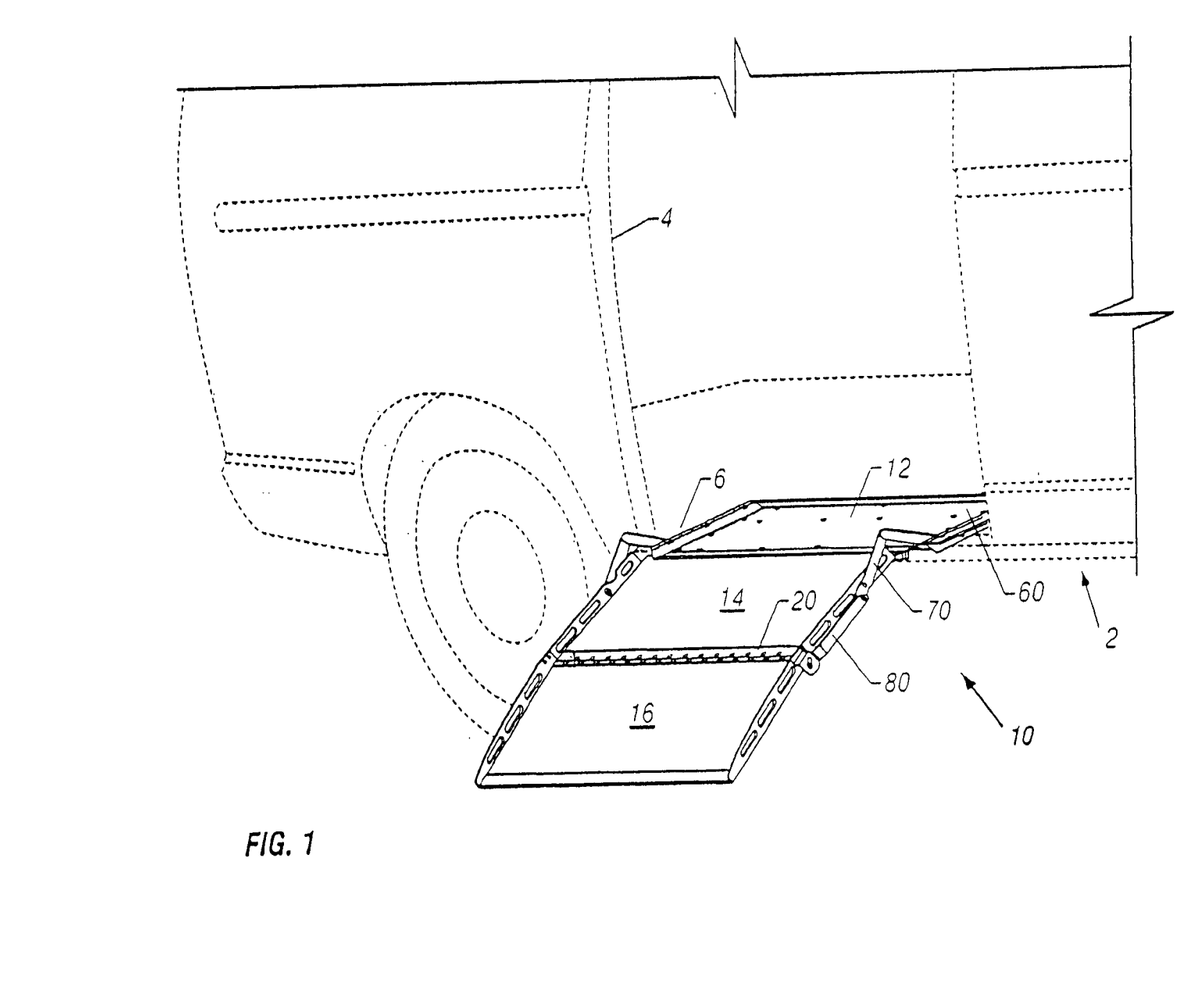
FIG. 1 a preferred embodiment of the foldable ramp of the present invention as installed in a bus.

FIG. 1 depicts a preferred embodiment of the foldable ramp 10 of the present invention that is mountable in a vehicle 2 to facilitate the ingress and egress of a wheelchair and its occupant. In a preferred embodiment, the foldable ramp 10 is mounted on the vehicle floor 6 near the side doorway 4. The foldable ramp can also be mounted near the rear door or any other door of a vehicle. The preferred vehicle for use with the ramp of the present invention is a van, bus or other low floor height vehicle.

Figure 2:
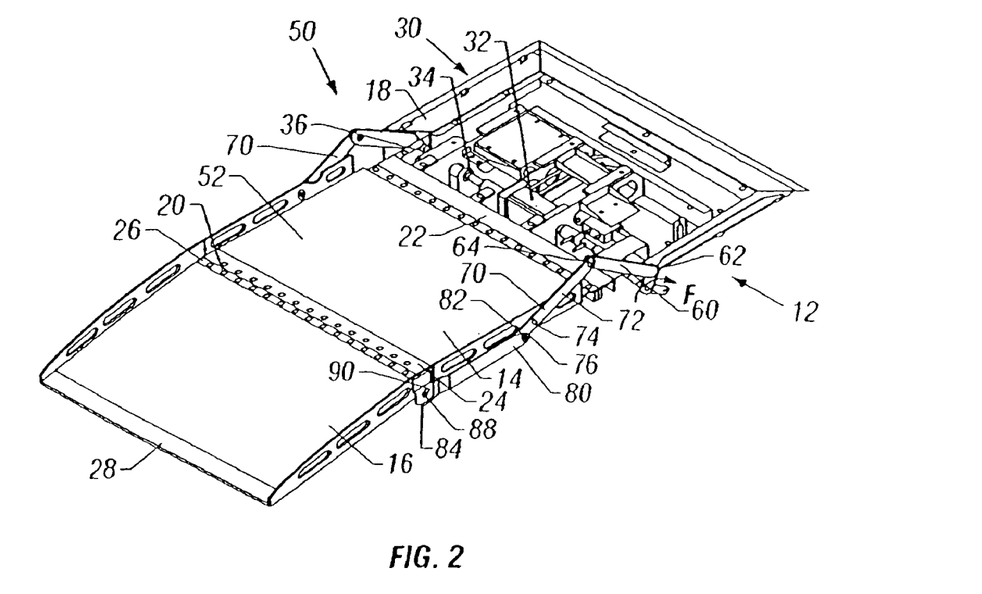
FIG. 2 is a perspective view of a preferred embodiment of the foldable ramp of the present invention with the base cover removed to show the driving mechanism of the ramp.

As best shown in FIGS. 1 and 2, a preferred embodiment of the foldable ramp 10 of the present invention includes a mountable base 12, a first ramp section 14 and a second ramp section 16. The mountable base 12 is preferably installed in the vehicle floor 6 and, in an extended configuration, first and second ramp sections 14 and 16 form an inclined ramp, and the distal edge 28 of the second ramp section 16 meets the ground thereby facilitating the ingress and egress of a wheelchair and its occupant on and off the vehicle.

In an extended configuration, the first ramp section 14 has a first edge 22 located proximal the mountable base 12 and a second opposing edge 24 located distal the mountable base 12. The second ramp section 16 has a first edge 26 pivotally connected to the second edge 24 of the first ramp section 14. In one embodiment of the invention, the first and second ramp sections 14 and 16 are pivotably connected using a hinge 20. However, it is within the scope of the invention to use other pivoting devices known in the art to pivotably connect the second edge 24 of the first ramp section 14 to the first edge 26 of the second ramp section 16.

Referring to FIG. 2, the interior of the mounting base 12 is shown without a top cover plate. The mounting base 12 preferably houses the driving mechanism 30 for actuating the ramp sections 14 and 16 from a folded, stowed configuration to a fully extended configuration. For ease of operation, the driving mechanism 30 can be powered by electrical, hydraulic, or pneumatic means, or other source of energy known to those skilled in the art.

In a preferred embodiment of the invention, the driving mechanism 30 includes an actuator 32 and a driving shaft 34. The driving shaft 34 extends to the sides 18 of the mountable base and is secured thereto by mounting brackets 36. The actuator 32 may be rotary or linear. In the embodiment shown in FIG. 2, the actuator 32 used is a rotary actuator commercially available from Micro-Precision Textron and is installed in the mountable base 12. The rotary actuator shown is preferably hydraulically driven and as such, is connected to a hydraulic control unit and hydraulic lines (not shown). The actuator 32 may also be driven by electrical, pneumatic or other energy means.

Figure 3:
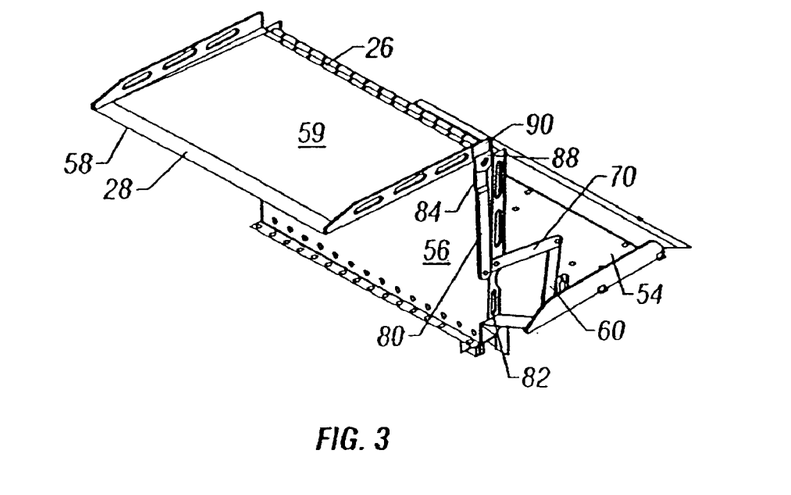
FIG. 3 is a perspective view of a preferred embodiment of the foldable ramp of the present invention during the folding process.
Figure 4:
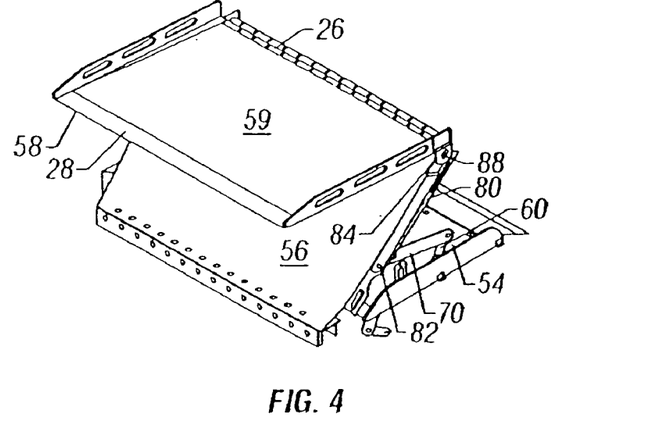
FIG. 4 is another perspective view of a preferred embodiment of the foldable ramp of the present invention during the folding process.
Figure 5:
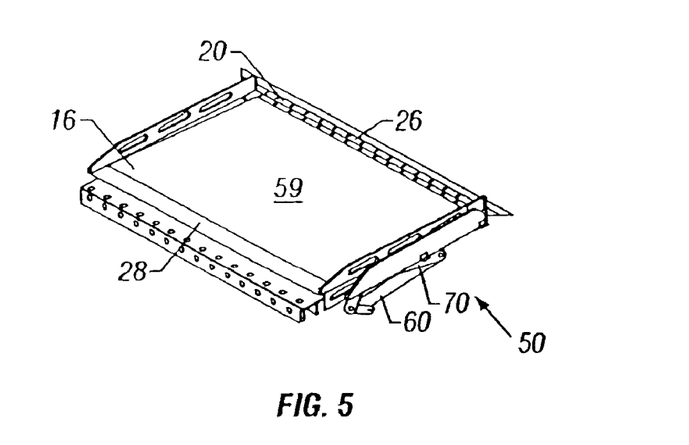
FIG. 5 is a perspective view of a preferred embodiment of the foldable ramp of the present invention in a fully folded, storage configuration.

In a preferred embodiment of the invention, as shown in FIGS. 2 through 6, the driving shaft 34 drives a pair of linkage assemblies 50 to fold ramp 10 into a storage configuration (as shown in FIG. 5) and thereafter, unfold the ramp into a fully extended ramp configuration (as shown in FIG. 2). For ease of understanding, only the left linkage assembly 50 will be described in detail and it should be understood that the right linkage assembly is a mirror image of the left linkage assembly. The linkage assembly 50 includes a driving arm 60, a driven arm 70 and a fold facilitating arm 80. A first end 62 of the driving arm 60 is operatively connected to the driving shaft 34. Upon actuation of the driving shaft 34 by actuator 32, force is exerted on the driving arm 60 causing the driving arm 60 to rotate in the same direction as the driving shaft 34. The second end 64 of the driving arm 60 is pivotably connected to a first end 72 of the driven arm 70. The driven arm 70 is preferably pivotably connected to the first ramp section 14 at a connection point 74.

When operating the ramp 10 from a fully extended ramp configuration to a folded storage configuration, the driving shaft 34 rotates in the direction designated as F in FIG. 2, causing the driving arm 60 to also rotate in the direction F about the driving shaft 34. As the driving shaft 34 and the driving arm 60 rotate in the direction F, the top surface 52 of the first ramp section 14 moves closer to the top surface 54 of the mountable base 12 (as shown in FIGS. 3 and 4). When the ramp 10 is in a folded storage configuration, shown in FIG. 5, the top surface 52 of the first ramp section 14 is in a substantially parallel, facing relationship with the top surface 54 of the mountable base 12. Also, during the folding process, the driving arm 60 and driven arm 70 move closer to each other, ending in a folded state (as shown in FIG. 5) when the ramp is in a folded storage configuration.

The foldable ramp of the present invention does not interfere with the structural elements of the vehicle in which it is installed in the manner of prior known ramps. For example, in a preferred embodiment of the invention, to achieve a 48 inch-long platform, the ramp enclosure only extends into a bus 26 inches. Accordingly, an original equipment manufacturer does not need to cut the main frame member of the bus to install the ramp.

In one embodiment of the invention, for every 2 inches of ramp length, the ramp enclosure extends into the bus roughly 1 inch. Thus, a 60 inch ramp only requires a 32 inch space in a bus, eliminating the need to cut the frame rail or other structural element.

Referring to FIGS. 2 through 5, the movement of the second ramp section 16 is now described. In a fully extended configuration, the first ramp section 14 and second ramp section 16 form a single, continuous inclined ramp for providing wheelchair access to and from vehicles. During the folding process, the fold facilitating link 80 causes the second ramp section 16 to pivot with respect to the first ramp section 14 and the bottom surface 58 of the second ramp section 16 moves closer to the bottom surface 56 of the first ramp section 14. When the ramp 10 is in a folded storage configuration, shown in FIG. 5, the bottom surface 56 of the first ramp section 14 is in a substantially parallel, facing relationship with the bottom surface 58 of the second ramp section 16. Also, during the folding process, the driven arm 70 and fold facilitating arm 80 move closer to each other, ending in a folded state when the ramp is in a folded storage configuration.

Figure 6:
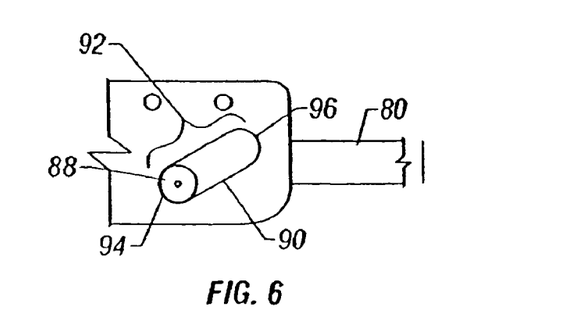
FIG. 6 is a side view of a preferred embodiment of the guide and wheel engagement that controls the folding movement of the ramp of the present invention.

In a preferred embodiment of the invention, a first end 82 of the fold facilitating link 80 is pivotally connected to a second end 76 of the driven arm 70 and the second end 84 of the fold facilitating link 80 preferably includes a wheel 88 adapted to engage a guide 90 on the second ramp section 16. As shown in FIG. 6, guide 90 preferably has a length 92 that is longer than the radius of the wheel 88, allowing the wheel space to move back and forth in the guide 90 from the first end 94 to the second end 96 of the guide. The ability of the fold facilitating arm 80 to move with respect to the second ramp section 16 enables the second ramp section to pivot and fold with respect to the first ramp section 14.

In a fully extended configuration (as shown in FIG. 2), wheel 88 is positioned at a first end 94 of the guide 90. In a preferred embodiment of the invention, the guide 90 is slightly inclined upward in a direction toward the first ramp section 14, as best shown in FIG. 6. When the folding process begins, the driving shaft 34 rotates, causing the driving arm 60 to rotate about driving shaft 34. Because the driving arm 60 is connected to the first ramp section 14, the first ramp section 14 moves towards the mounting base 12. The fold facilitating link 80, together with the first edge 26 of the second ramp section 16 are raised with as the first ramp section 14 moves toward the mounting base 12, while the second edge 28 of the second ramp section 16 is pulled downward by the force of gravity. As the first edge 26 of the second ramp section 16 is raised and the second edge 28 is lowered, the second ramp section 16 pivots and folds with respect to the first ramp section 14 and the bottom surface 58 of the second ramp section 16 moves closer to the bottom surface 56 of the first ramp section 14.

In reference to FIG. 6, the movement of the wheel 88 in guide 90 is described. During the folding process, as the fold facilitating link 80 is raised, wheel 88 moves from the first end 94 of the guide 90 toward the second end 96. By limiting the motion of the wheel 88 within guide 90, the folding action is controlled. When the first ramp section 14 is substantially vertical, wheel 88 reaches the second end 96 of the guide 90. As the first ramp section 14 moves from the substantially vertical position to the completely folded position, the wheel 88 again moves from the second end 96 of the guide 90 back to the first end 94. In a fully folded storage configuration, wheel 88 rests against the first end 94 of the guide 90.

It is within the scope of the invention to vary the shape and length of the guide 90 to control the folding movement of the ramp as desired. For example, in a preferred embodiment of the invention, the ends 94, 96 of guide 90 have a radius of curvature 98 that is greater than the radius of wheel 88 to facilitate smooth motion of the wheel 88 within the guide 90. Other such modifications may be made without departing from the inventive concept disclosed herein.

Figure 7A:
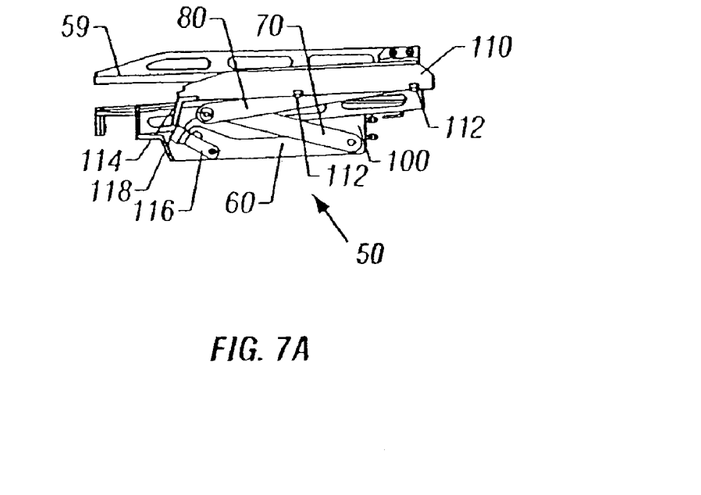
FIGS. 7A through 7D are side views of a preferred embodiment of the foldable ramp of the present invention, showing the movement of the storage area lid as the linkage assembly moves in and out of the storage area.
Figure 7B:
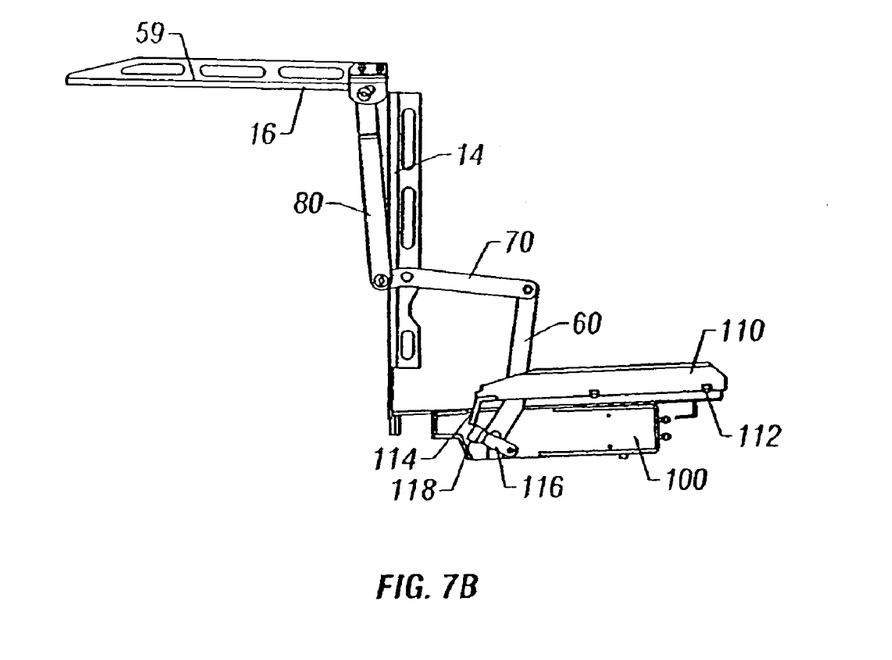
Figure 7C:
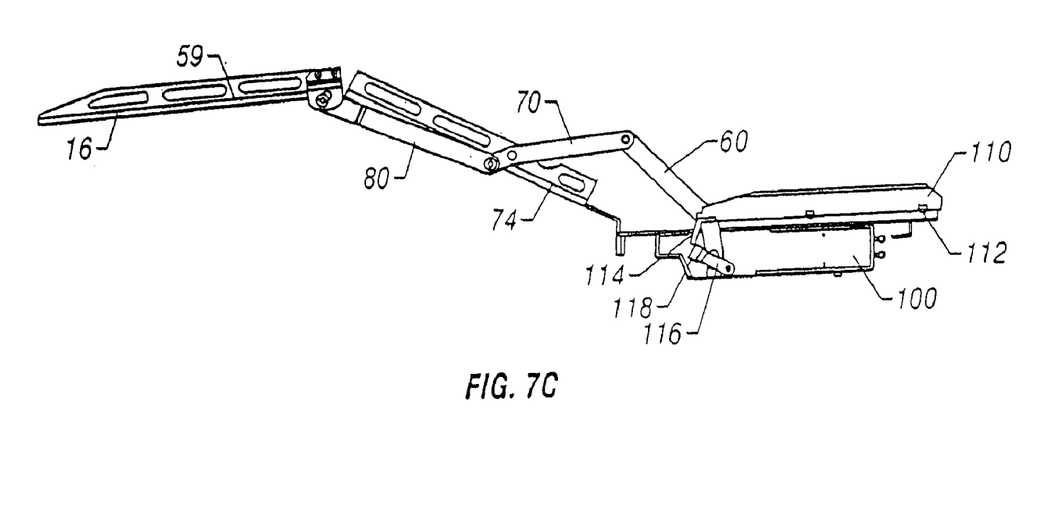

As best shown in FIG. 7A, the driving arm 60, driven arm 70 and at least part of the fold facilitating arm 80 preferably collapse in a storage area 100 when the ramp 10 is in a folded configuration. In a preferred embodiment of the invention, the storage area 100 is dimensioned to receive the linking assembly 50 so that the top surface 59 of the second ramp section 16 is substantially in the same plane as the vehicle floor 6 (shown in FIG. 1). When the ramp 10 unfolds, the linking assembly 50 expands and moves out of the storage area 100.

The empty gap left in the storage area 100, if uncovered, may pose a hazard to a person using the ramp. For example, if a part of a wheelchair becomes lodged in the storage area 100, the wheelchair may topple, and the wheelchair occupant may be injured. Similarly, if a person's foot becomes lodged in the storage area 100, the person may trip, fall and sustain injuries. Accordingly, in a preferred embodiment of the invention, a storage area lid 110 is provided to cover the storage area 100 when the ramp 10 is in an extended configuration.

Figure 7D:
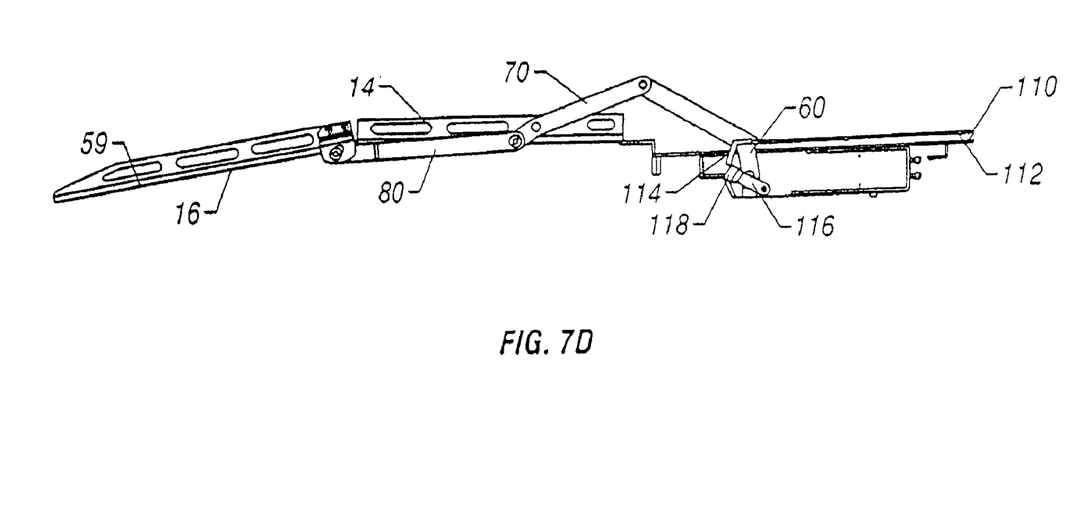
Figure 8:
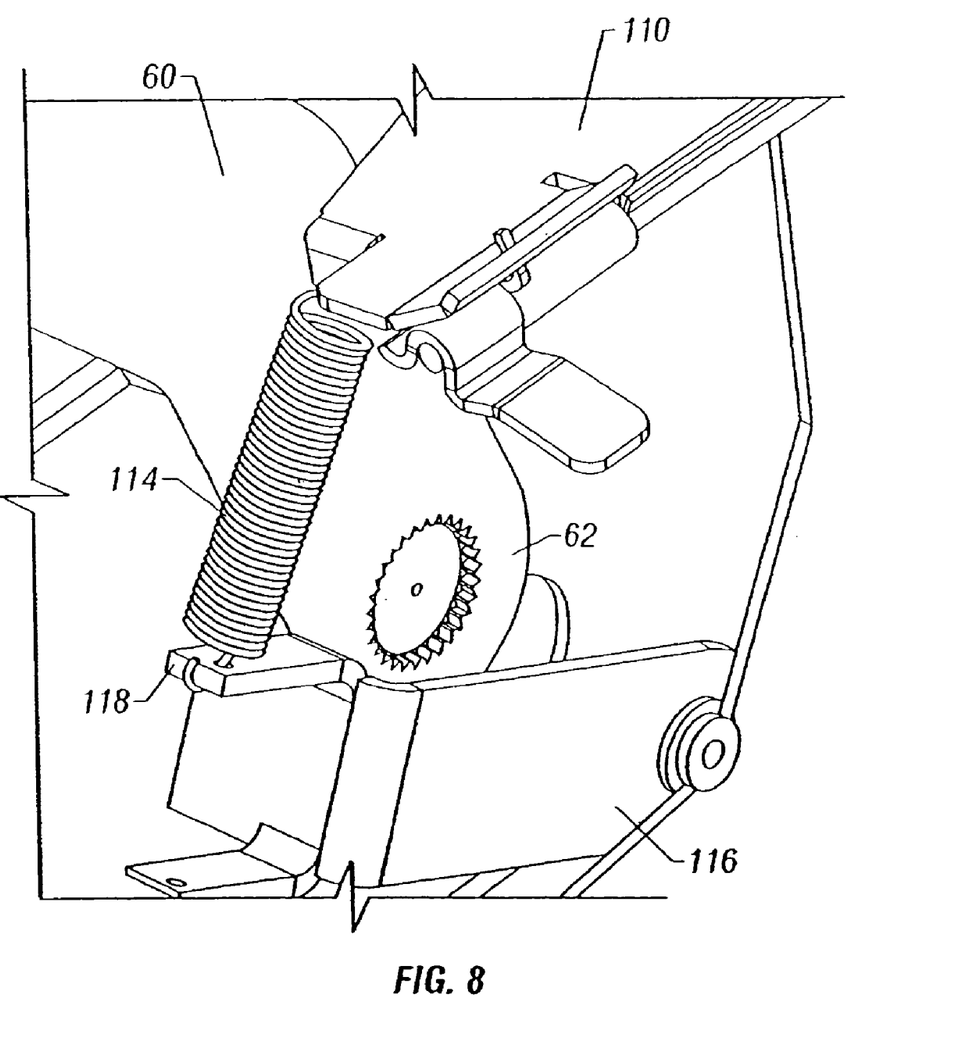
FIG. 8 is a perspective view of a preferred embodiment of the driving arm camming against the support member.

The storage area lid 110 is preferably designed to automatically cover the storage area 100 as the ramp unfolds without the need of human intervention. As shown in FIGS. 7A through 7D and 8, a preferred storage area lid 110 is biased in an open position by opening springs 112 or other known biasing devices. To facilitate the closing of the lid 110, a closing spring 114 connects the lid to a first end 118 of a pivotable support member 116. As the linking assembly 50 extends outwardly from the storage area 100, the driving arm 60 contacts the support member 116 (as best shown in FIG. 8). The rotation of the driving arm 60 creates a camming action on the support member 116, causing the support member 116 to pivot and the first end 118 of the support member to move in a downward direction. By pivoting, the support member 116 pulls the closing spring 114 until the biasing forces of the opening springs are overcome and the lid is forced downward to a closing position (as shown in FIG. 7D). As a result, when the ramp is in a fully extended position, the empty storage area 100 is covered by the lid 110.

When the ramp is again folded, lid 110 opens to allow the linking assembly 50 to enter the storage area 100. During the folding process, the driving arm 60 rotates away from the support member 116, causing the support member to pivot and the first end 118 of the support member 116 to move upward. As the tension on the closing spring 114 is released, the biasing force on the lid 110 causes the lid to open, thus allowing the linkage assembly access to the storage area. It is within the scope of the present invention to replace springs 112 and 114 with other types of springs or other types of biasing devices.

Figure 9:
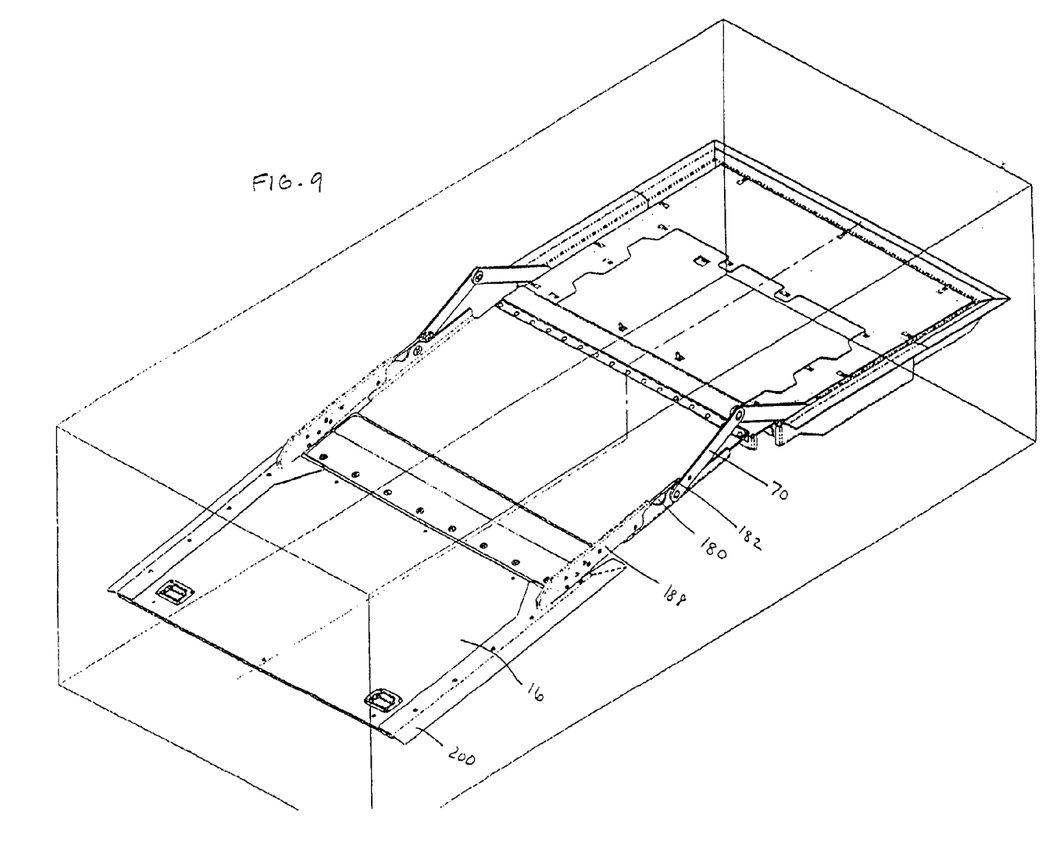
FIG. 9 is a perspective view of another preferred embodiment of the foldable ramp of the present invention.
Figure 10:
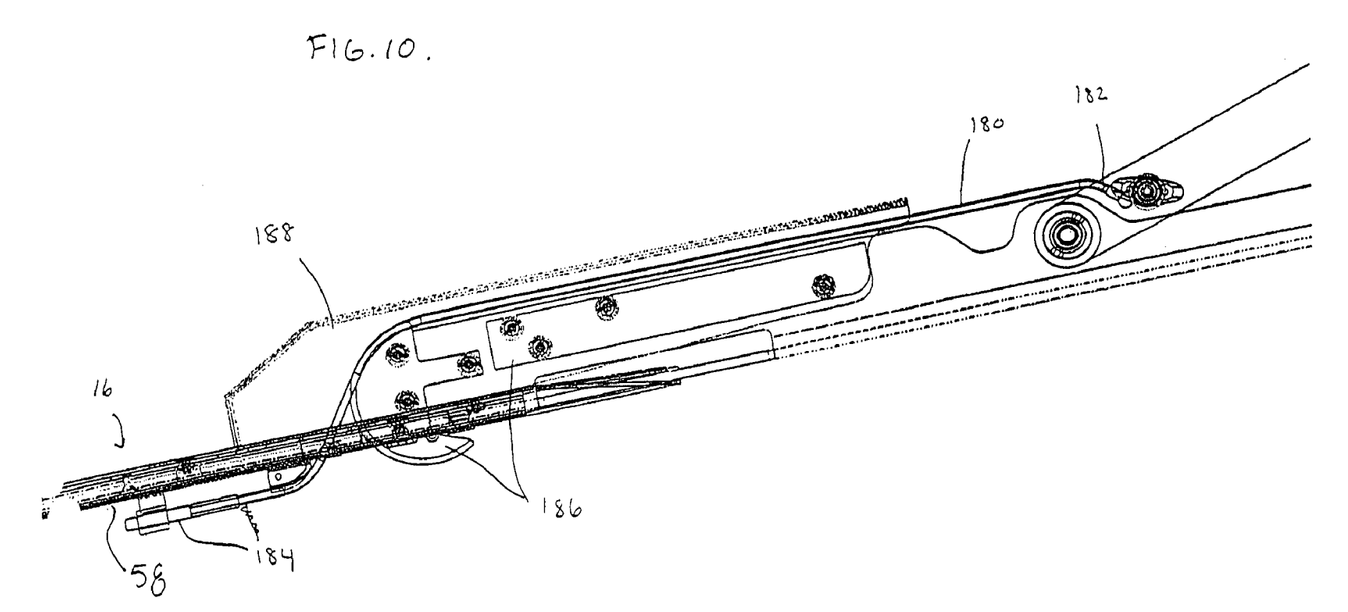
FIG. 10 is a perspective view of another preferred embodiment of fold facilitating link of the present invention.

FIGS. 9 and 10 show another preferred embodiment of the foldable ramp of the present invention, wherein the foldable ramp has a fold facilitating link 180. In the embodiment shown, the fold facilitating link is a wire cable. It is envisioned that the fold facilitating link can be made of any material that is capable of supporting the weight of the ramp and capable of causing the second ramp section to fold with respect to the first ramp section, including, but not limited to, metal, rubber, rope, cloth, chain or any other such material.

In a preferred embodiment of the invention, the fold facilitating link has a first end 182 attached to the driven arm 70 and a second end 184 attached to the second ramp section 16. As shown in FIG. 10, the second end 184 of the fold facilitating link 180 is preferably attached to the bottom surface 58 of the second ramp section 16. Various guiding members 186 can be used to maintain the fold facilitating link 180 in position. A cover 188 may be provided to partially or entirely shield the fold facilitating link 180 from the elements.

It is envisioned that the point of attachment of the first and second ends 182, 184 of the fold facilitating link may vary. In a preferred embodiment of the invention, the attachment point is selected to cause the second ramp section 16 to begin unfolding early enough in the deployment cycle to enable the ramp to extend out over a tall curb, such as a curb that is as high or higher than the inboard edge 22 of the first ramp section 14.

As previously described, the driving arm 60, driven arm 70 and at least part of the fold facilitating link 180 collapse into storage area 100 when the ramp 10 is in a folded configuration. In the embodiment shown in FIG. 9, the storage area lid 200 comprises flaps extending from the second ramp section 16. As ramp 10 folds, the storage area lid 200 approaches the storage area 100, and when ramp 100 is in a folded configuration, storage area lid 200 covers storage area 100. In the embodiment shown, storage area lid 200 comprises flaps fastened to and extending from the sides of the second ramp section 16. It is envisioned that the lid 200 may also comprises flaps integrally attached to the second ramp section 16.

Those skilled in the art may now make numerous uses of, and departures from, the above-described embodiments without departing from the inventive concepts disclosed herein. Accordingly, the present invention is to be defined solely by the scope of the following claims.

What is claimed is:

1. A foldable ramp for use in a vehicle having a floor, comprising:

a power source;

a base;

a first ramp section proximal the base and a second ramp section distal the base, the first and second ramp sections each having a top surface and a bottom surface when in an unfolded condition;

a linking assembly operatively connecting the first ramp section to the power source, the linking assembly further having a fold facilitating arm, comprising a cable, connected to the second ramp section, wherein during folding, the fold facilitating arm causes the second ramp section to pivot with respect to the first ramp section; and a folded configuration wherein the bottom surface of the first ramp section is in a facing relationship with the bottom surface of the second ramp section, wherein the bottom surfaces are substantially parallel to the vehicle floor and wherein the top surface of the second ramp section is substantially coplanar with the vehicle floor.

2. The foldable ramp of claim 1 wherein the cable comprises a chain.

3. The foldable ramp of claim 1 wherein the cable comprises a wire.

4. The foldable ramp of claim 1 wherein the cable comprises metal.

5. A foldable ramp assembly comprising:

a base;

a ramp;

a linking assembly connecting the base to the ramp and pivotally moving the ramp with respect to the base;

a storage area;

a folded configuration wherein the linking assembly is at least partially housed in the storage area;

an extended configuration wherein the storage area is empty;

a storage area lid that covers the storage area in the extended configuration and uncovers the storage area in the folded configuration, wherein the storage area lid extends from the ramp.

6. The foldable ramp assembly of claim 5 wherein the ramp further comprises a first ramp section proximal the base and a second ramp section distal the base, and wherein the storage area lid extends outward from the second ramp section.

7. The foldable ramp assembly of claim 5 wherein the storage area lid is fastened to the second ramp section.

8. A foldable ramp for use in a vehicle having a floor, comprising:

a power source;

a base;

a first ramp section proximal the base and a second ramp section distal the base, the first and second ramp sections each having a top surface and a bottom surface when in an unfolded condition;

a linking assembly operatively connecting the first ramp section to the power source, the linking assembly further having a fold facilitating link connected to the second ramp section, wherein during folding, the fold facilitating link causes the second ramp section to pivot with respect to the first ramp section;

a folded configuration wherein the bottom surface of the first ramp section is in a facing relationship with the bottom surface of the second ramp section, the bottom surfaces are substantially parallel to the vehicle floor, and the top surface of the second ramp section is substantially coplanar with the vehicle floor.

9. The foldable ramp of claim 8 wherein the linking assembly further includes a driven arm, the fold facilitating link has a first end and a second end, the first end of the fold-facilitating link is connected to the driven arm, and the second end of the fold-facilitating link is connected to the second ramp section.

10. The foldable ramp of claim 8, further comprising a guide connected to the second ramp section, wherein the fold facilitating link engages the guide.

* * * * *